J. C. Connor
Clothes Frame,
N⁰ 57,681. Patented Sep. 4, 1866.
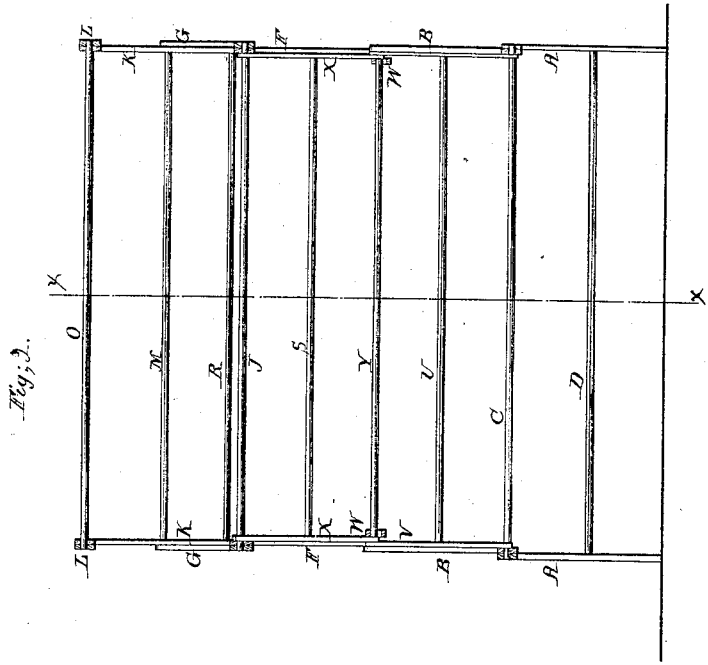
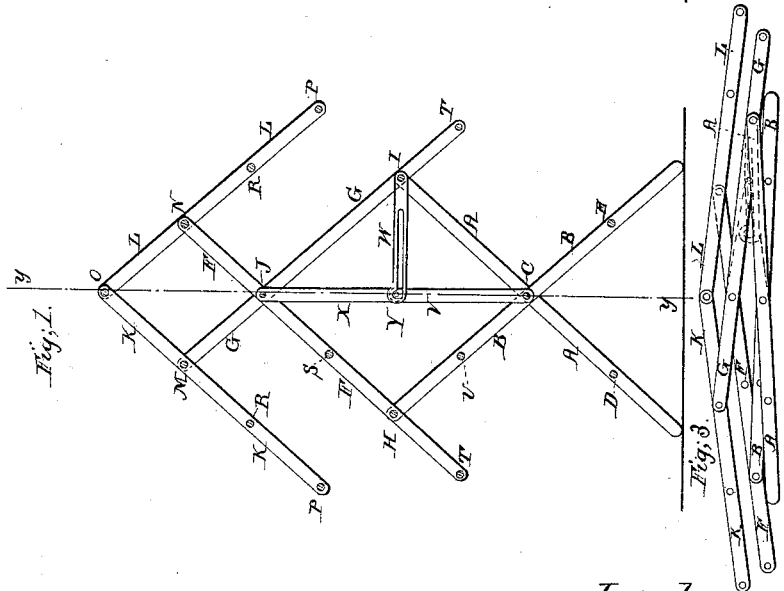 
Witnesses;
Jas. A. Service
J. W. Barrington
Inventor;
J. C. Connor
Per Munn & Co
Attorneys

UNITED STATES PATENT OFFICE.

J. C. CONNOR, OF DOVER, NEW HAMPSHIRE.

IMPROVEMENT IN CLOTHES-DRIERS.

Specification forming part of Letters Patent No. 57,681, dated September 4, 1866.

*To all whom it may concern:*

Be it known that I, J. C. CONNOR, of Dover, Stafford county, State of New Hampshire, have invented a new and useful Improvement in Clothes-Driers; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved clothes-drier, taken through the line $x\ x$, Fig. 2. Fig. 2 is a vertical longitudinal section of the same, taken through the line $y\ y$, Fig. 1. Fig. 3 is an end view of the same folded.

Similar letters of reference indicate like parts.

My invention has for its object to furnish an improved clothes-drier, light, simple in construction, cheap, and occupying little space, either when folded or when open; and one which will be strong, will afford a large amount of drying-surface, and will allow a free circulation of air among the suspended clothes; and it consists of the combination of pivoted bars and steps with each other, with the end pieces, and with the horizontal bars of the clothes-drier, for the purpose of holding the drier open securely when supporting the drying clothes; and, second, in pivoting the end pieces to each other in such a manner that the drier may be folded by bringing its bottom and top toward each other, causing its pivoted end pieces to take an almost horizontal position, as hereinafter more fully described.

The two lower end pieces, A and B, are pivoted to each other, at a point near or a little above their centers, by the ends of a horizontal bar, C, which should be of a length equal to the desired length of the drier. The lower ends of the pieces A and B form the feet of the drier.

D and E are horizontal bars connecting the lower parts of the end pieces A and of the end pieces B, strengthening the drier and furnishing a support for the smaller articles to be dried.

To the upper ends of the end pieces B and A are pivoted the second pair of end pieces, F and G, at points at a distance from the lower ends of said end pieces F and G about equal to one-quarter of the length of said end-pieces, by horizontal bars H and I, as shown. The end pieces F and G cross each other at points at a distance from their upper ends about equal to one-quarter of the length of said end pieces, and they are there pivoted to each other by a horizontal bar, J.

To the upper ends of the pieces G and F are pivoted the third or top pair of end pieces, K and L, at points at a distance from the upper ends of said end pieces, K and L, about equal to one-third the length of said pieces, by horizontal bars M and N. The upper ends of the end pieces K and L meet and are pivoted to each other by the horizontal bar O. The lower parts of the end pieces K, and also of the pieces L, are connected together by horizontal bars P and R, at a distance apart equal to about one-third the length of the said bars K and L.

S is a bar connecting the bars F at points equally distant from the pivoting-points of the bars H and J; but the corresponding parts of the end pieces, G, are left vacant to allow space for the operation of the pivoted bars forming the lock. The lower ends of the bars F and of the bars G are connected together by the bars T, as shown.

U is a bar connecting the end pieces, B, at points equally distant from the pivoting-points C and H; but the corresponding parts of the pieces A are left vacant to allow space for the operation of the pivoted bars which form the locks.

To the horizontal bars C, I, and J, at each end of the drier, are pivoted three arms or bars, V, W, and X. These three bars at each end of the drier are connected together by the horizontal bar Y, the bars V and X by being pivoted to the ends of said bar Y; but the bars W are slotted, and through these slots pass the ends of the bar Y. Upon the upper side of the inner ends of these slots are formed notches, into which the bar Y fits when the drier is open, and holds the said drier securely open, nor can it be folded without first raising the bars W. Then the bar Y can slide along the slots, and the drier can be folded into the position shown in Fig. 3.

I claim as new and desire to secure by Letters Patent—

The bars V W X, constructed as described, in combination with each other, with the horizontal bars C, I, J, and Y, and with the end pieces A B F G of the clothes-drier, substantially as described, and for the purpose set forth.

J. C. CONNOR.

Witnesses:
ASA FREEMAN,
JOHN B. STEVENS, Jr.